United States Patent
Sprenkel et al.

(10) Patent No.: US 10,300,408 B2
(45) Date of Patent: *May 28, 2019

(54) CRUDE OIL STORAGE TANK WITH ELECTROSTATIC INTERNALS TO DEHYDRATE CRUDE OIL WITHIN A PROCESS TRAIN OF A FLOATING PRODUCTION STORAGE AND OFFLOADING INSTALLATION

(71) Applicant: Cameron Solutions, Inc., Houston, TX (US)

(72) Inventors: Marcus D. Sprenkel, Houston, TX (US); Gary W. Sams, Spring, TX (US); S. Pavankumar B. Mandewalkar, Houston, TX (US); Luis Eduardo Caires Fernandez, Cypress, TX (US)

(73) Assignee: CAMERON SOLUTIONS, INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/918,485

(22) Filed: Mar. 12, 2018

(65) Prior Publication Data

US 2018/0200646 A1 Jul. 19, 2018

Related U.S. Application Data

(63) Continuation of application No. 14/977,880, filed on Dec. 22, 2015, now Pat. No. 9,914,073.

(51) Int. Cl.
*B01D 17/06* (2006.01)
*B01D 17/04* (2006.01)
*B01D 17/02* (2006.01)
*B03C 11/00* (2006.01)
*B65D 90/52* (2006.01)
*C10G 33/06* (2006.01)
*E21B 43/34* (2006.01)

(52) U.S. Cl.
CPC ........ *B01D 17/045* (2013.01); *B01D 17/0211* (2013.01); *B01D 17/06* (2013.01); *B03C 11/00* (2013.01); *B65D 90/52* (2013.01); *C10G 33/06* (2013.01); *E21B 43/34* (2013.01); *B03C 2201/02* (2013.01)

(58) Field of Classification Search
CPC ........ C02F 1/463; B01D 17/045; B01D 17/06
See application file for complete search history.

(56) References Cited

U.S. PATENT DOCUMENTS 4,200,516 A * 4/1980 Pope ............ B01D 17/06
                                                  204/671
4,469,582 A     9/1984 Sublette et al.
(Continued)

*Primary Examiner* — Brian W Cohen
(74) *Attorney, Agent, or Firm* — Hauptman Ham, LLP

(57) ABSTRACT

A process train for a floating production storage and offloading installation includes a crude oil storage tank that is equipped with at least one electrostatic separator configured to subject the produced stream that enters the tank to an electric field. The electrostatic separator may include two inclined vessels containing electrostatic internals and in fluid communication with one another. Employing electrostatic separators within the tank can permit an allowable inlet water content into the tank of up to 80%, significantly reducing the required topside processing equipment.

18 Claims, 3 Drawing Sheets

(56) References Cited

U.S. PATENT DOCUMENTS

| | | | |
|---|---|---|---|
| 5,494,586 A * | 2/1996 | Inoue | B01D 17/0208 |
| | | | 204/666 |
| 6,280,637 B1 | 8/2001 | Eccles | |
| 6,860,979 B2 | 3/2005 | Sams | |
| 7,351,320 B2 | 4/2008 | Sams | |
| 8,591,714 B2 | 11/2013 | Sams et al. | |
| 9,095,790 B2 | 8/2015 | Sams | |
| 2009/0159426 A1 | 6/2009 | Chen | |

* cited by examiner

CRUDE OIL STORAGE TANK WITH ELECTROSTATIC INTERNALS TO DEHYDRATE CRUDE OIL WITHIN A PROCESS TRAIN OF A FLOATING PRODUCTION STORAGE AND OFFLOADING INSTALLATION

CROSS REFERENCE TO PENDING APPLICATIONS

The present application is a continuation of pending U.S. patent application Ser. No. 14/977,880, filed Dec. 22, 2015, which is incorporated herein by reference.

BACKGROUND OF THE INVENTION

This invention relates to systems, apparatuses, and methods used to dehydrate crude oil for storage in crude oil storage tanks of floating production storage and offloading ("FPSO") installations. More specifically, the invention relates to a process train that includes electrostatic technology housed within the storage tank.

Conventional topside oil separation trains on FPSO installations employ electrostatic separators to dehydrate crude oil for storage in crude oil storage tanks. These separators are part of the topside process train, and are typically large horizontal pressure vessels, which take up space and allowable weight.

Undertaking the dehydration of the crude oil within the crude oil storage tank, by fitting the storage tank with conventional electrostatic internals, would eliminate the requirement for a separate electrostatic pressure vessel in the process train. While this solution would save space and weight, the percentage water cut of the inlet oil steam would be limited to only about 30%. Therefore, a need exists for a more robust solution to handle water content of up to 80%.

SUMMARY OF THE INVENTION

A preferred embodiment of a crude oil storage tank for use in a floating production storage and offloading ("FPSO") installation includes a tank having an inlet section that receives an oil-and-water mixture, an oil outlet section that receives a dehydrated crude oil, and an electrostatic separator section located between the inlet and outlet sections. The inlet section provides an oil-and-water mixture to the electrostatic separator section and the electrostatic separator section provides a dehydrated oil product to the oil outlet section and a water product to a water outlet section of the tank.

The electrostatic separator section of the tank houses at least one set of electrostatic (high velocity) internals, preferably of the type disclosed in U.S. Pat. No. 8,591,714 B2 and U.S. Pat. No. 9,095,790 B2 to Sams et al., both incorporated by reference herein. Because the electrostatic internals are housed within the crude oil storage tank, the weight of this equipment is removed from the topside and becomes part of the boat's structure.

Preferably, each set of the electrostatic internals is made up of a first and a second elongated leg connected one to the other and oriented at an incline or oblique angle relative to a longitudinal centerline of the crude oil storage tank, each leg providing a defined treatment flow path for treating the incoming oil-and-water mixture, with the first leg having a closed upper end, the second leg having an open upper end, and each leg having open bottom ends located in a water outlet section of the tank. The legs are inclined so the lower end of each lies closer to the inlet section side of the tank and the upper end lies closer to the oil outlet section side of the tank. The flow path itself is confined to the legs where the oil-and-water mixture is subjected to an electric field.

The inlet to the first leg is in communication with the inlet section of the crude oil storage tank. The oil outlet of the first leg is the inlet to the second leg. The oil outlet of the second leg is in communication with the outlet section of the crude oil storage tank. Dehydrated oil exits the oil outlet located along the upflow end of the second leg and separated water exits the water outlet at the downflow ends of the first and second legs.

Employing one or more sets of the electrostatic internals within the crude oil storage tank permits the allowable inlet water content of stream to increase above 30% and up to 80%, significantly reducing the required topside processing equipment. Additionally, no pre-treater is required.

Because the crude oil storage tank when equipped with the electrostatic internals can handle large volumes of water, the first and second separator vessels arranged upstream of the tank can be vertically oriented vessels smaller in size than the typical horizontal separator vessel used in FPSO process trains. The same is true of the other vessels used in the system. A flash vessel is arranged downstream of the first and second vertical separator vessels, a degasser vessel is arranged downstream of the flash vessel, and the crude oil storage tank equipped with the electrostatic internals is arranged downstream of the degasser vessel.

An electrostatic treater is then arranged downstream of the crude oil storage tank. Employing DUAL FREQUENCY® technology (Cameron Solutions, Inc., Houston, Tex.) within the treater is viable for water cuts approaching 50%.

A preferred embodiment of a process for removing water from a produced oil-and-water stream includes the step of routing the produced oil-and-water stream to the electrostatic separator section of the crude oil storage tank, with the produced oil-and-water stream being treated upstream of the tank by the first and second separator vessels, a flash vessel, and a degasser vessel.

Objectives of this invention include providing a system and process design that reduces the size and weight requirements of prior art FPSO process trains yet still achieves the final BS&W and salt requirements while accommodating streams with higher volumes of water flowing into the crude oil storage tank.

ELEMENTS AND NUMBERING USED IN THE DRAWINGS AND DETAILED DESCRIPTION

Figure 1:
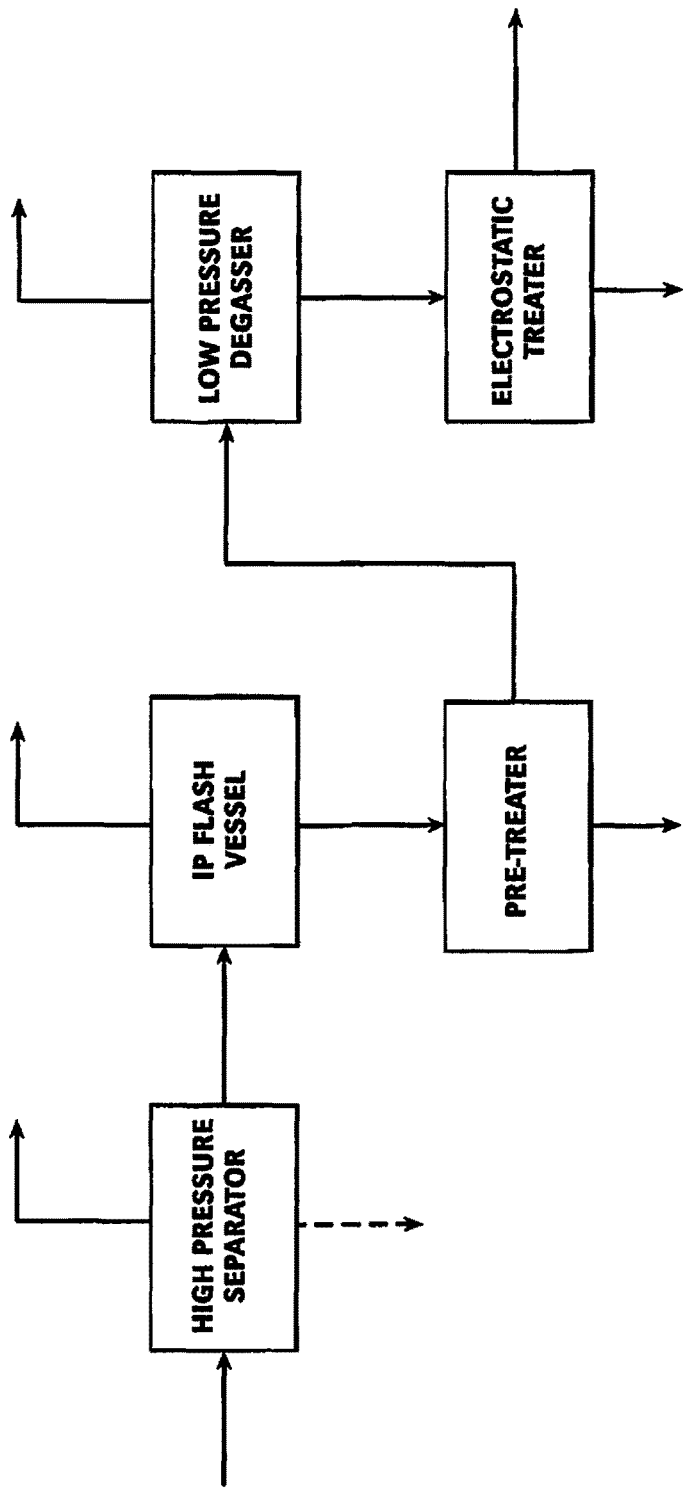
FIG. 1 is a block flow diagram of a prior art topside process train.

10 Process train
15 Produced oil-and-water stream
20 High pressure ("HP") separator/degasser vessel
25 Outlet stream from 20, inlet stream to 30
30 Intermediate pressure ("IP") flash vessel
35 Outlet stream from 30, inlet stream to 40
40 Low pressure ("LP") degasser vessel
45 Outlet stream from 40, inlet stream to 50
50 Crude oil storage tank ("cargo tank")

51 Inlet section or inlet (produced water) volume of 50
52 Oil-and-water mixture inlet
53 Partition isolating 51 from 67, 70
55 Oil outlet section or oil storage volume of 50
57 Baffle
59 Oil outlet
61 Longitudinal centerline of 50
65 Outlet stream from 50, inlet stream to 100
67 Water outlet section or water storage volume of 50
69 Water outlet
70 Electrostatic separator section or volume of 50
71 Electrostatic internals (high water cut separators)
72 Elongated cylindrical pipe, vessel or leg
73 Inlet
74 Closed top end
75 Upflow end or portion of 72
76 Open bottom end
79 Oil outlet
80 Longitudinal center line (treatment flow path)
81 Oil-dominant flow or stream
85 Downflow end or portion of 72
86 Water outlet (open end)
91 Water-dominant flow or stream
100 Electrostatic treater
105 Outlet stream

DETAILED DESCRIPTION OF THE PREFERRED EMBODIMENTS

A preferred embodiment of a crude oil storage tank includes an electrostatic separator section having at least one set of electrostatic internals arranged to provide a treatment flow path oblique to a longitudinal centerline of the crude oil storage tank and isolated from a surrounding volume of the electrostatic separator section. The set of electrostatic internals is arranged for communication with an oil-and-water inlet section of the crude oil storage tank, a water outlet section of the crude oil storage tank, and an oil outlet section of the crude oil storage tank. An oil-and-water stream or mixture entering the set of electrostatic internals travels along the treatment flow path and is subjected to an electric field. The treatment flow path is in an upwardly direction toward the oil outlet section and in a downwardly opposite direction toward the water outlet section of the tank. Dehydrated oil exits the electrostatic internals and can reside outside of the electrostatic internals in the electrostatic separator section and in the oil outlet section. In either case, the oil floats above the water residing in the water outlet section or volume of the tank.

The set of electrostatic internals can include a first leg and a second leg, the legs being cylindrical in shape and elongated. The legs may be arranged parallel to one another with the second leg e located downstream of the first leg and a bottom end of at least one of the legs lying closer to the oil-and-water inlet section of the crude oil storage tank than does a top end of the leg. The size or length of the legs is determined based upon tank size and the requirements of a particular application.

The first leg has a closed top end and an open bottom end, with the open bottom end located in the water outlet section of the crude oil storage tank. The inlet to the first leg is connected to an outlet of the oil-and-water inlet section and is located toward the bottom end of the leg. The second leg has an open bottom end, again located in the water outlet section and, if the second leg is the last leg in the set, an open top end exposed to the surrounding volume of the electrostatic separator section. An outlet of the first leg is an inlet to the second leg, with the inlet being located along a downflow portion of the second leg.

The crude oil tank includes a partition that isolates the oil-and-water inlet section from the electrostatic separator section. Baffles can be placed where appropriate. In a preferred embodiment, a baffle is located between the electrostatic separator section and the oil outlet section and there is a baffle located in the water outlet section.

For the purpose of comparison to the preferred embodiments, the prior art topside process train of FIG. 1 is used. This prior art train includes a high pressure separator, an intermediate pressure flash vessel (mounted on the pre-treater), a pre-treater, a low pressure degasser vessel (mounted on the electrostatic treater), and an electrostatic treater (see Table 1). The train also includes a crude oil storage tank located downstream of the electrostatic treater.

TABLE 1

Prior art process train.

| HP Separator | |
| --- | --- |
| Operating Pressure: | 2,000 kPa (a) |
| Operating Temperature: | 40° C. |
| Slug volume: | 20 m³ |
| Maximum Water Content in Crude Outlet: | 25% vol |
| Size: | 4.4 m ID × 16.0 m T/T Horizontal |
| IP Flash Vessel (mounted on Pre-treater) | |
| Operating Pressure: | 770 kPa (a) |
| Operating Temperature: | 90° C. |
| Liquid Hold Up: | 2 Minutes |
| Size: | 3.3 m ID × 10.0 m T/T Horizontal mounted on Pre-treater |
| Pre-Treater | |
| Operating Pressure: | 770 kPa (a) |
| Operating Temperature: | 90° C. |
| Maximum Water Content in Crude Outlet: | 1% vol |
| Size: | 3.3 m ID × 10.0 m T/T Horizontal |
| LP Degasser (mounted on Electrostatic Treater) | |
| Operating Pressure: | 250 kPa (a) |
| Operating Temperature: | 75-80° C. |
| Liquid Hold Up: | 2 Minutes |
| Size: | 3.3 m ID × 10.0 m T/T Horizontal mounted on Pre-treater |
| Electrostatic Treater | |
| Operating Pressure: | 250 kPa (a) |
| Operating Temperature: | 75-80° C. |
| Maximum Water Content in Crude Outlet: | 0.5% vol |
| Maximum Salt content in Crude Outlet: | 285 mg/l |

The train is designed to achieve a maximum total liquids flow rate of 24,000 m³/day (150,000 bpd), a maximum oil flow rate of 24,000 m³/day (150,000 bpd), a maximum produced water flow rate of 19,100 m³/day (120,000 bpd), and maximum gas flow rate of 6,000,000 m³/day. The incoming crude oil properties are 27 API; viscosity 47.1, 30.3 and 19.9 cSt at 30°, 40°, and 50° C. respectively; initial paraffin deposit temperature of 40° C. first event and 20° C. second event; pour point of 12° C.; and severe foaming. The oil temperature on arrival to the train is in a range of 20° C. (maximum oil cases) to 40° C. (maximum water cases).

The size and weight requirements of the train are shown in Table 2. The train, not including the crude oil storage tank, requires a plot area of 275 m², with a dry weight of 353.4 tonnes. Note the amount of water-in-oil decreases at each successive processing step, with 25% water content in the outlet stream of the high pressure separator to a 1% water content in the inlet streams to the pre-treater and low pressure degasser vessel.

TABLE 2

Size and weight requirements of prior art process train.

| Equipment Item | Technology & Performance | Residence Requirements | Size (ID × T/T) | Plot Area (m²) | Weights (Tonnes) |
|---|---|---|---|---|---|
| HP Separator | Existing 2/3-Phase Separator Inlet: 20-80% Water, 80-20% Oil Outlet: 25% Water-in-Oil | 2 Phase: 2 Mins Liquids @ 1255 m³/hr = 41.83 m³ 3 Phase: 5 minutes Oil @ 1061 m³/hr = 88.4 m³ 5 minutes Water @ 794 m³/hr = 66.2 m³ 20 m³ Surge both 2 & 3 phase | 4.4 m × 16 m Horizontal | 95 | 117.5 Dry 302.5 Op. |
| IP Flash Vessel | Existing Design Inlet: 20.8-28% Water-in-Oil | 2 minutes @ 1346 m³/hr = 44.8 m3 | 3.3 m × 10 m Horizontal | Inc. Below | 39.4 Dry, 92.4 Op |
| Pre-Treater | Existing Electrostatic Technology Outlet: 1% Water-in-Oil | As Required for Spec | 4.2 m × 16 m Horizontal | 90 | 83.8 Dry, 286.8 Op |
| LP Degasser | Existing Design Inlet: 1% Water-in-Oil | 2 minutes @ 1159 m³/hr = 38.6 m3 | 3.2 m × 10 m Horizontal | Inc. Below | 30.5 Dry, 77.5 Op. |
| Electrostatic Treater | Existing Electrostatic Technology Desalter +100 m³/hr Wash Water Outlet: 0.5% BS&W 285 mg/l Salt | As Required for Spec | 4.2 m × 16 m Horizontal | 90 | 82.2 Dry 288.2 Op |
| Total | — | — | — | 275- | 353.4 Dry 1047.4 Op |

Figure 2:
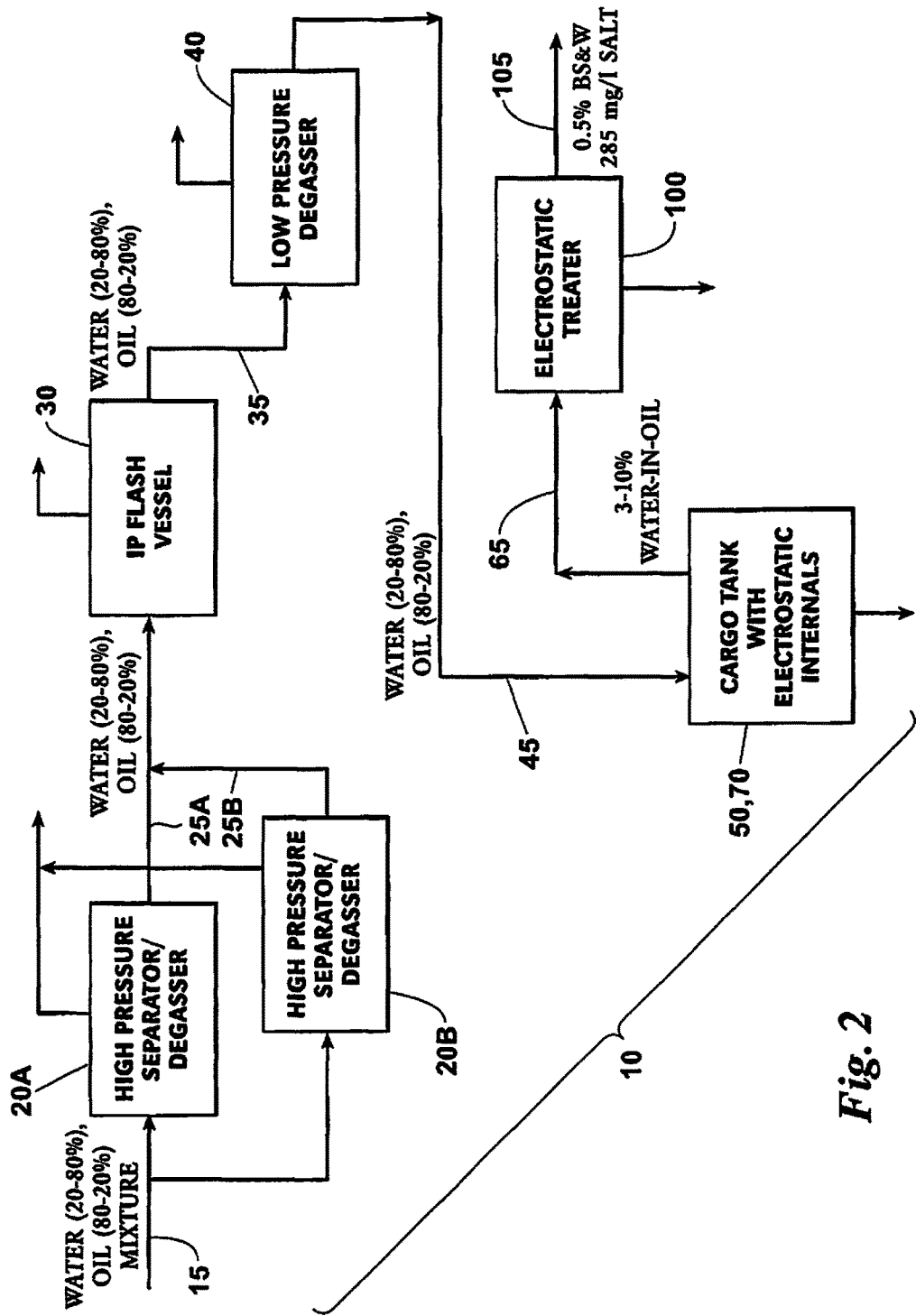
FIG. 2 is a block flow diagram of a preferred embodiment of a topside process train that practices the system and method of this invention.

Referring now to FIG. 2, a preferred embodiment of a topside process train 10 includes a first and second high pressure separator/degasser vessel vessels 20A & B arranged to receive an incoming oil-and-water mixture 15, an intermediate pressure flash vessel 30 arranged downstream of the vessels 20A & B, a low pressure degasser vessel 40 arranged downstream of the flash vessel 30, a crude oil storage tank ("cargo tank") 50 arranged downstream of the degasser vessel 40 and equipped with electrostatic internals 70, and, finally, an electrostatic treater 100 arranged downstream of the crude oil storage tank 50. Compared to the prior art train of FIG. 1, the process train of FIG. 2 has plot area of 75 m², thereby reducing space requirements by 198 m² (a 72% reduction), and a dry weight of 83.3 tonnes, thereby reducing the total weight by 270.1 tonnes (a 76% reduction, with operating weight reduced by 82%).

TABLE 3

Preferred embodiment of the process train.

| Equipment Item | Technology & Performance | Residence Rqmts. | Size (ID × T/T) | Plot Area (m²) | Plot Area Reduction | Weights (Tonnes) | Weight Reduction |
|---|---|---|---|---|---|---|---|
| HP Separator 20A & B Two (2) × 50% | CONSEPT ® Compact Design Inlet: 20-80% Water, 80-20% Oil | 30 Seconds liquid retention with cyclonic degassing | Two (2) 2.5 m × 10.0 m Vertical | 20 | −75 | 46.0 Dry 56.0 Op. | −71.5 Dry −246.5 Op |
| IP Flash Vessel 30 | CONSEPT ® Compact Design Inlet: 20-80% Water, 80-20% Oil | Cyclonic degassing with no slug volume rqmt. | 1.6 m × 5.3 m Vertical | 6 | +6 | 1.4 Dry, 3.4 Op. | −38.0 Dry, −89.0 Op |
| LP Degasser Vessel 40 | CONSEPT ® Compact Design Inlet: 20-80% Water, 80-20% Oil | Cyclonic degassing with no slug volume rqmt. | 1.6 m × 5.3 m Vertical | 6 | +6 | 1.4 Dry, 3.4 Op. | −29.1 Dry, −74.1 Op. |
| Pre-Treater | n/a | n/a | n/a | n/a | −90 | n/a | −83.8 Dry, −286.8 Op |
| Cargo Tank 50 | Electrostatic separator internals 70 Inlet: 20-80% Water, 80-20% Oil | Existing | Existing | Existing | n/a | n/a | n/a |

TABLE 3-continued

Preferred embodiment of the process train.

| Equipment Item | Technology & Performance | Residence Rqmts. | Size (ID × T/T) | Plot Area (m$^2$) | Plot Area Reduction | Weights (Tonnes) | Weight Reduction |
|---|---|---|---|---|---|---|---|
| | Outlet: 3-10% Water in Oil | | | | | | |
| Electrostatic Treater 100 | Hi-flux DUAL FREQUENCY ® electrostatic desalter +100 m$^3$/hr Wash Water Outlet: 0.5% BS&W 285 mg/l Salt | As Required for Spec | 4.2 m × 6.1 m Horizontal | 45 | −45 | 34.5 Dry 123.3 Op. | −47.7 Dry −164.9 Op. |
| Total | — | — | — | 77 | −198 | 83.3 Dry 186.1 Op | −270.1 Dry −860.3 Op |

The prior art train requires the use of horizontal separator, flash and treater vessels because the amount of water entering the flash vessel cannot exceed 30% and the amount entering the electrostatic treater cannot exceed 10%. Therefore, produced streams having high water content require an appropriate amount of processing equipment volume to handle the water content so that the flash vessel does not see water volumes of 30% or more. Process train 10, on the other hand, can pass larger volumes of water from one piece of equipment to the other ahead of the crude oil storage tank 50 because the electrostatic separator internals 70 of the tank 50 can handle water volumes up to 80% and reduce those volumes to 3 to 10% prior to the electrostatic treater 100.

The separator/degasser vessel vessels 20 are each vertical vessels arranged parallel to one another so that each receives a 50% split of an incoming produced oil-and-water stream 15. Typically, the percentage of water in the stream 15 can be in a range of 20% to 80% by volume, with the percentage of oil by volume varying accordingly. In some cases, the water is 95% by volume. Each vessel 20A & B is a high pressure separator suitable for an operating pressure of about 2,000 kPa (atm) at an operating temperature of 40° C. Preferably, each vessel 20A & B is equipped with an inlet having a cyclonic distributor.

By way of example, a CONSEPT® inlet cyclonic distributor (Cameron Solutions, Inc., Houston, Tex.) is a suitable (and preferred) inlet device. This device includes an inlet section, a dissipating volume, and a number of gas-liquid cyclones. After the inlet flange, the inlet velocity is retarded in a nozzle housing guiding vanes and then dissipated into the distribution chamber. The outlet stream 25 A & B from each vessel 20 A & B respectively, is combined and routed to the flash vessel 30. Flash vessel 30 can be an intermediate pressure flash vessel suitable for an operating pressure of 770 kPa (atm) at an operating temperature of 90° C. The flash vessel 30 is preferably equipped with an inlet having a cyclonic distributor. The CONSEPT® inlet cyclonic distributor is a suitable (and preferred) inlet device.

The outlet stream 35 from the flash vessel 30 is routed to the degasser vessel 40. Degasser vessel 40 is a vertical degasser vessel suitable for an operating pressure of 250 kPa (atm) at an operating temperature of 75° to 80° C. Similar to the vessels 20 and 30, the degasser vessel 40 is preferably equipped with an inlet having a cyclonic distributor such as the CONSEPT® inlet cyclonic distributor.

The outlet stream 45 from the degasser vessel 40 is routed to the cargo tank 50 equipped with electrostatic internals (see e.g. U.S. Pat. No. 8,591,714 B2 and U.S. Pat. No. 9,095,790 B2 to Sams et al., the subject matter of which is incorporated by reference herein, provide examples of electrostatic internals that can be modified for use in tank 50). Employing electrostatic internals within the crude oil storage tank 50 permits the allowable inlet water content of stream 45 to increase above 30% and up to 80%, significantly reducing the required topside processing equipment.

Figure 3:
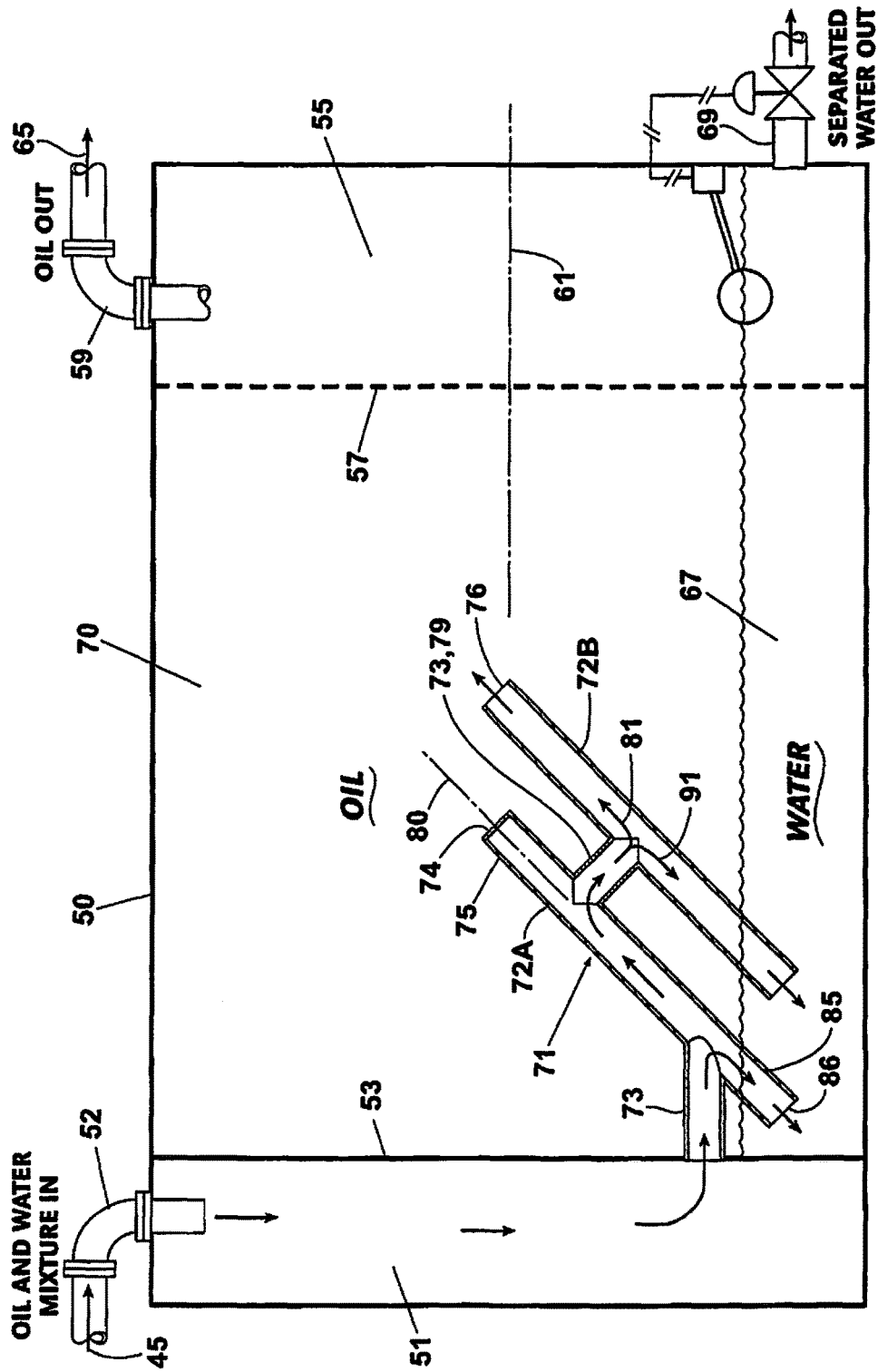
FIG. 3 is a view of the crude oil storage tank of FIG. 2 equipped with electrostatic internals.

Referring now to FIG. 3, in a preferred embodiment tank 50 includes an inlet section 51 (which receives the outlet stream 45 from the degasser vessel 40), an electrostatic separator section 70, a water outlet or storage section 67, and an oil outlet or storage section 55. The exact volume "V" of each section 51, 55, 67, 70 is determined by the requirements of a particular application. A partition 53 separates the electrostatic separator section 70 from the inlet section 51. A baffle (or sets of baffles) 57 lie between the separator section 70 and the oil outlet section 55 and divides the water outlet section 67.

Within the electrostatic separator section 70 is one or more sets of electrostatic internals 71 with two or more legs 72 oriented vertically, horizontally, or at an incline. Each leg 72, which can be a cylindrical pipe, defines an elongated treatment path 80 for the incoming oil-and-water stream 45, separating the stream 45 into an oil dominant flow 81 and a water dominant flow 91. (The elongated treatment path 80 is represented by the longitudinal centerline of the leg 72.) A vertical orientation has logistical advantages, a horizontal orientation has fluid flow advantages, and an inclined orientation blends the advantages of the two. Preferably, the treatment path 80 is oblique to a longitudinal centerline 61 of the tank 50.

In a preferred embodiment, the set of electrostatic internals 71 includes at least two legs 72, a first leg 72A and a second leg 72B located downstream of the first, arranged parallel to one another and at an incline. Each leg has an upflow end or portion 75 and a downflow end or portion 85. The downflow end 85 of both legs 72A & B is open at its bottom 86 and passes a water dominant flow 91 to the water outlet section 67. However, upflow end 75 of the first leg 72A is a closed end 74 whereas the upflow end 75 of the second leg 72B is an open end 76. The upper ends 76 of the legs 72A & B lie closer to the oil outlet section 55 of the tank 50 than does the bottom ends 86.

An electrode (not shown) may be placed in the inlet 73, the upflow end 75 of the leg 72, or in both the inlet 73 and upflow end 75 (see e.g. U.S. Pat. No. 8,591,714 B2 and U.S. Pat. No. 9,095,790 B2). The electrode, which is connected to a voltage source (not shown) establishes a treatment field within the leg 72. As the incoming stream 45 is exposed to the electric field, the largest water droplets coalesce and flow downward and the drier oil flows upward.

The oil-and-water stream 45 entering the inlet section 51 is distributed to an inlet 73 of the first leg 72A and initial separation occurs as the stream 45 is subjected to the treatment field, with an oil dominant flow 81 flowing upwardly and a water dominant flow 91 flowing downwardly. Preferably, inlet 73 is located toward the open bottom end 86 of the first leg 72A. The water dominant flow 91 exits the open bottom end 86 of the leg 72A and the oil dominant flow 81 exits an outlet 79 of the first leg 72A, which serves as an inlet 73 to the second leg 72B. Preferably, the inlet 73 to the second leg 72 is located along the downflow end 85.

The stream is once again subjected to a treatment field within the second leg 72B. Another water dominant flow 91 exits the open bottom end 86 and a now-drier oil dominant flow 81 exits the open end 76 of the leg 72B. The oil dominant flow 81 then enters the oil outlet section 51 of the tank where it is removed as outlet stream 65. Stream 65 contains about 3 to 10% water-in-oil.

In this way, the tank 50 serves as the separation vessel with its electrostatic internals 71 performing the fluid separation.

The outlet stream 65 from the crude oil storage tank 50 is routed to the electrostatic treater 100. The electrostatic treater 20 is of a type well known in the art and provides an outlet stream 105 suitable for downstream processes or uses. Preferably, the BS&W content of stream 105 is no greater than 0.5% BS&W and 285 mg/l salt. Alternatively, employing DUAL FREQUENCY® technology (Cameron Solutions, Inc., Houston, Tex.) within the treater 100 is viable for water cuts approaching 50%. The DUAL FREQUENCY® technology is described in U.S. Pat. No. 6,860,979 B2 and U.S. Pat. No. 7,351,320 B2 to Sams, the contents of which are herein incorporated by reference. This technology uses an AC voltage to establish an electric field within the electrostatic treater at a selected frequency F1 and modules an intensity of the AC voltage at a selected frequency F2, F1>F2. The higher (high) base frequency F1 provides strong electrostatic forces. The lower (or low) frequency F2 amplitude modulation of the electrostatic field provides improved conditions for water droplet coalescence, which further improves the dehydration and desalting efficiency.

The preferred embodiments provide examples of the system and method. The following claims define the scope of the invention, including the full range of equivalency to the recited elements.

What is claimed:

1. A cargo tank comprising:
  an interior volume having one or more electrostatic separator sections connected to an inlet of the cargo tank and isolated from other interior volumes of the cargo tank, the inlet configured to receive a produced stream containing oil and water;
  wherein at least one of the electrostatic separator sections houses at least one electrostatic separator vessel.

2. A cargo tank according to claim 1, wherein the at least one electrostatic separator vessel is oriented oblique to a longitudinal centerline of the cargo tank.

3. A cargo tank according to claim 1, wherein at least one of the electrostatic separator sections includes at least two legs containing electrostatic internals, the at least two legs in fluid communication with one another.

4. A cargo tank according to claim 1, wherein the at least one electrostatic separator vessel is cylindrical shaped.

5. A cargo tank according to claim 1, further comprising the inlet including a portion of the interior volume housing the produced stream.

6. A cargo tank according to claim 1, further comprising a portion of the interior volume housing oil separated from the produced stream.

7. A cargo tank according to claim 6, wherein an oil outlet of at least one of the electrostatic separator sections is in fluid communication with the portion of the interior volume housing oil separated from the produced stream.

8. A cargo tank according to claim 1, further comprising a portion of the interior volume housing water separated from the produced stream.

9. A cargo tank according to claim 8, wherein a water outlet of at least one of the electrostatic separator vessels is in fluid communication with the portion of the interior volume housing water separated from the produced stream.

10. A storage tank comprising:
  an interior volume having one or more electrostatic separator sections connected to an inlet of the storage tank and isolated from other interior volumes of the storage tank, the inlet configured to receive a produced stream containing oil and water;
  wherein a treatment flow path of at least one of the electrostatic separator sections houses at least one electrostatic separator vessel.

11. A storage tank according to claim 10, wherein the at least one of the electrostatic separator vessel is oriented oblique to a longitudinal centerline of the storage tank.

12. A storage tank according to claim 10, wherein at least one of the electrostatic separator sections includes at least two legs containing electrostatic internals, the at least two legs in fluid communication with one another.

13. A storage tank according to claim 10, wherein the at least one electrostatic separator vessel is cylindrical shaped.

14. A storage tank according to claim 10, further comprising the inlet including a portion of the interior volume housing the produced stream.

15. A storage tank according to claim 1, further comprising a portion of the interior volume housing oil separated from the produced stream.

16. A storage tank according to claim 15, wherein an oil outlet of at least one of the electrostatic separator sections is in fluid communication with the portion of the interior volume housing oil separated from the produced stream.

17. A storage tank according to claim 10, further comprising a portion of the interior volume housing water separated from the produced stream.

18. A storage tank according to claim 17, wherein a water outlet of at least one of the electrostatic separator sections is in fluid communication with the portion of the interior volume housing water separated from the produced stream.

* * * * *